(12) United States Patent
MacAuley

(10) Patent No.: US 9,238,534 B2
(45) Date of Patent: Jan. 19, 2016

(54) WATERPROOF CLOSURE SYSTEM

(71) Applicant: Aquapac International Limited, London (GB)

(72) Inventor: Andrew Sean MacAuley, Bitterley (GB)

(73) Assignee: AQUAPAC INTERNATIONAL LIMITED, London (GB)

(*) Notice: Subject to any disclaimer, the term of this patent is extended or adjusted under 35 U.S.C. 154(b) by 0 days.

(21) Appl. No.: 14/672,958

(22) Filed: Mar. 30, 2015

(65) Prior Publication Data

US 2015/0274389 A1  Oct. 1, 2015

(30) Foreign Application Priority Data

Apr. 1, 2014  (GB) .................................. 1405864.8

(51) Int. Cl.
*B65D 53/02* (2006.01)
*B65D 85/38* (2006.01)
*G03B 17/08* (2006.01)

(52) U.S. Cl.
CPC ................. *B65D 53/02* (2013.01); *B65D 85/38* (2013.01); *G03B 17/08* (2013.01)

(58) Field of Classification Search
CPC ........ B65D 53/02; B65D 85/38; G03B 17/08; H04N 5/2252
See application file for complete search history.

(56) References Cited

U.S. PATENT DOCUMENTS

| | | | | | |
|---|---|---|---|---|---|
| 4,033,392 A | * | 7/1977 | Less | ........................ | A45C 11/38 206/316.2 |
| 5,159,366 A | * | 10/1992 | Gell, Jr. | ................. | G03B 17/08 206/811 |
| 5,239,323 A | * | 8/1993 | Johnson | ................. | G03B 17/08 396/27 |
| 5,285,894 A | * | 2/1994 | Kamata | ................. | G03B 17/08 206/316.1 |
| 5,456,277 A | * | 10/1995 | Pontius, Jr. | ........... | H04N 5/2252 135/90 |
| 5,848,299 A | * | 12/1998 | Shepper | ................. | G03B 17/08 396/29 |
| 8,781,312 B1 | * | 7/2014 | deSouza, Jr. | ........... | A45C 11/38 396/27 |
| 2008/0247749 A1 | * | 10/2008 | Law | ........................ | A45C 11/38 396/535 |
| 2009/0057181 A1 | * | 3/2009 | Leung | .................... | G03B 17/08 206/316.2 |
| 2011/0249965 A1 | * | 10/2011 | Appel | .................. | G03B 17/568 396/448 |

FOREIGN PATENT DOCUMENTS

| | | |
|---|---|---|
| DE | 2233881 A1 | 1/1974 |
| GB | 2212138 A | 7/1989 |

* cited by examiner

*Primary Examiner* — W B Perkey
(74) *Attorney, Agent, or Firm* — Epstein Drangel LLP; Robert L. Epstein

(57) ABSTRACT

A waterproof closure system 1 including a plate 20 having a periphery 21 and at least one closure member 30 which can be fitted around the periphery of the plate so that when they are joined the closure member forms a border around the periphery of the plate. The closure member has at least two elements 30a, 30b separated by a split 41 with there being a locking means, for example having a male part 42 provided on a first element on one side of said split and a female part 44 provided on a second element on the other side of said split that can lock the two elements together o closing the split and tightening the closure member around the periphery of the plate thereby locking a mouth of a bag placed around the plate between the plate periphery and closure member.

27 Claims, 4 Drawing Sheets

WATERPROOF CLOSURE SYSTEM

FIELD OF THE INVENTION

The present invention relates to waterproof closure system and in particular but not exclusively a waterproof system for protecting electronic equipment.

BACKGROUND OF THE INVENTION

More and more people are now getting involved in activities such as watersports including boating, sailing or surfing and they take equipment with them during these activities that they use in their day to day activities, for example electronic equipment including cameras, mobile phones, MP3 players, laptops, mobile tablets. In addition other items such as food or books may be taken along. However in activities such as watersports there is always the risk that the item may be knocked or dropped into water where there is the risk that it will be damaged or rendered useless depending how much contact there is with the water.

Waterproof sealing systems are known for a range of products. Typically these systems involve the use of a bag into which a product is inserted and then the bag is closed in some way so that the product is encased in the bag. The system uses clips or fasteners such as those described in U.S. Pat. No. 1,899,696 where clip members can be used to temporarily close the end of a bag. In this case the device includes clip members connected by a spring hinge at one end and can be fastened together by a depressible spring clasp at the other to close the bag.

Another type of closure is one as described in our earlier European Patent EP-B-0763377 which describes a closure mechanism in which two bars are releasably connectable together to clamp the edge of a bag between them to close the bag. The releasable connection is formed by at least one bayonet connector and the bars are connected to each other by the twisting of a bayonet closure. However in some cases, the small size of the bayonet connector may make it difficult for a user to quickly open or close the bag.

Other devices involve some physical interaction between two parts of the closure means such as the use of press studs, clamps or by securing one member to another so that the end of a bag is clamped between the parts.

However these known systems use fastening arrangements where one part of the fastener engages with another in a single plane means that if they are not secured tightly enough to one another there may be ingress of water between gaps in the two parts of the fastener. Further the tightening of fasteners such as nuts can be awkward because it requires both hands which may be difficult, especially if the hands are cold or wet.

Additionally, known cases often need to be opened and closed in order for a user to operate a device such as a camera that is in the case but the present invention provides a "use through case" which means that the device inside the case can be operated without having to be removed and this avoids the risk of a device being damaged if it is dropped by a person engaged in an activity such as sailing or canoeing where dropping the device in water could damage the device permanently. A further disadvantage is that when using small individual parts such as nuts or screws, they may be inadequately tightened which means that proper sealing may not be provided around an enclosed item.

Finally, if the sealing system is used in a marine environment, often metal parts such as nuts and bolts must be made from marine grade steel which is resistant to rusting and this adds to the expense of production of the bag. Also if the bag that is used has to be folded over as part of the closure process then additional material for the bag is need which adds to the cost of the bag and hence the whole system. The two-dimensional nature of all previous clamps means that, in order to create an aperture big enough for a device such as a camera to pass through, the flattened-material must be much longer than the item itself, and therefore the clamp must be disproportionally larger.

The present invention seeks to overcome the problems of the prior art by providing a system that is easy to use and which forms a particularly efficient waterproof covering for the device inside.

In addition the system is easy to use and provides a system where there is minimal risk of the parts not being secured together correctly and which is also cost effective. Further the invention allows for a larger aperture for a case which means that the case/bag can easily accommodate the dimensions of the object that is to be placed in the case/bag.

SUMMARY OF THE INVENTION

According to a first aspect of the invention there is provided a waterproof closure system provided by a plate having a periphery and at least one closure member which can be fitted around the periphery of the plate such that when the plate and closure member are joined the closure member forms a border around the periphery of the plate, the closure member having at least two elements separated by a split in the closure member, with there being locking member that can secure said two elements together so closing the split and securing the closure member around the periphery of the plate thereby locking a mouth of a bag around the plate if placed between the plate and closure.

Preferably, a male part is provided on a first element on one side of said split and a female part provided on a second element on the other side of said split and engagement of the male and female part draws the two elements together thereby closing the split.

In one embodiment the male part is a screw and the female apart is an aperture for receiving the screw.

In another embodiment the male part is formed of a shaft having a first end with a profile that fits a keyhole in the female part, and a second end of the male part remote from the first end having a lever substantially at right angles to the shaft such that when the male and female parts are joined the lever can be turned to lock the male and female parts together It is preferred that the plate is formed of a rectangle having an apex at either end.

Preferably the closure member is formed of two elements that are securable together to form a border around the periphery of the plate. However it is envisaged that the closure member may be one piece joined together by a hinge at one end and having male and female parts at the other for releasably securing the closure member together at either side of the split in the closure member. It is preferred that the two elements are releasable securable together but they may also be fixed together if required. It is envisaged also that if the closure member is hinged, a portion of the mouth of the bag may be fixed to the plate along a portion of the periphery of the plate and one part of the closure member is positioned over this part of the plate. The closure member can be fixed or releasably secured over this portion of the bag. A portion of the bag is not attached to the plate so that an item can be inserted in the bag, following which the other part of the closure member that is hinged to the first can be brought into contact with the periphery of the plate to lock the bag against the plate. The advantage of this is that all parts are connected so that one piece cannot become detached from the others.

It is envisaged that the female member is formed as an aperture having a first face with at least one cut out which receives a matching profile from the male part, said aperture having a second face having a cut away and cam surface that allows the profile of the male part to turn when in the female part on actuation of a lever.

It is envisaged that each element making up a closure member is formed of a linear section each end of which has a leg extending obliquely therefrom with an extension projecting outwardly from the respective leg. To make the closure member is optimal to have two elements that can be attached together at either end because this minimises the number of parts for the waterproof closure system. However in some circumstances this does not rule out using more than two elements, for example if a complicated profile is used for the plate.

Preferably one element making up the closure member has male parts at either end while the second element has female parts at either end.

It is envisaged that each element has an inner face which when attached to the plate comes into contact with the periphery of the plate, said inner face having a groove running along said inner surface.

Preferably the groove is a v shaped groove offset to the centre of the inner face.

It is preferred that the plate has fixing means so that the plate may be attached to an object that is to be inserted in the bag. An example of such a fixing would be a screw that could attach to a camera case.

It is preferred that the fixing means is a screw that can be pass through the plate and secure to the object, which typically is a camera and more particularly and SLR camera.

In a preferred arrangement an underside of the plate has feet. The feet are typically provided as raised areas on the surface of the plate towards the edges of the plate allow the plate to be placed on surface so that an object attached to the plate can be supported on a surface.

According to another aspect of the invention there is provided a waterproof closure system and bag which may incorporate all the features as previously described. The waterproof closure system provided by a plate having a periphery and at least one closure member which can be fitted around the periphery of the plate such that when the plate and closure member are joined the closure member forms a border around the periphery of the plate, the closure member having at least two elements separated by a split in the closure member, with there being locking member that can secure said two elements together so closing the split and securing the closure member around the periphery of the plate thereby locking a mouth of a bag around the plate if placed between the plate and closure.

In particular a male part is provided on a first element on one side of said split and a female part provided on a second element on the other side of said split and engagement of the male and female part draws the two elements together thereby closing the split.

The locking member may be a screw or there may be a male part provided on a first side element on one side of said split and a female part provided on a second element on the other side of said split, the male part being formed of a shaft having a first end with a profile that fits a keyhole in the female part, and a second end of the male part remote from the first end having a lever substantially at right angles to the shaft such that when the male and female parts are joined the lever can be turned to lock the male and female parts together so closing the split and securing the closure member around the periphery of the plate thereby locking a mouth of a bag around the plate if placed between the plate and closure.

It is preferred that the bag is formed of a thermoplastic film and examples of such films include polyurethane, polyvinyl chloride (PVC), ethylene vinyl acetate (EVA).

It is envisaged that the mouth of the bag has a ridge extending around the mouth of the bag which can seat within a groove on an inner face of the closure member.

According to a further aspect of the invention there is provided a method of sealing a bag around an electronic device comprising attaching a plate having a periphery to said electronic device, positioning a mouth of a bag over the electronic device and around the periphery of the plate, positioning a closure member around the plate so the closure member forms a border around the periphery of the plate, inserting a first end of a male part provided on the closure member on a first side of a split in a female part provided on a second side of said split, and activating a lever on a second end of the male remote from the first end to turn so locking the male and female parts together to secure the closure member around the periphery of the plate so locking the mouth of the bag around the plate to enclose and seal the electronic the object in the bag which is sealed by the waterproof closure system.

BRIEF DESCRIPTION OF THE FIGURES

An embodiment of the invention will be described with reference to and as illustrated in the accompanying figures by way of example only, in which.

DETAILED DESCRIPTION OF EMBODIMENTS OF THE INVENTION

Figure 1:
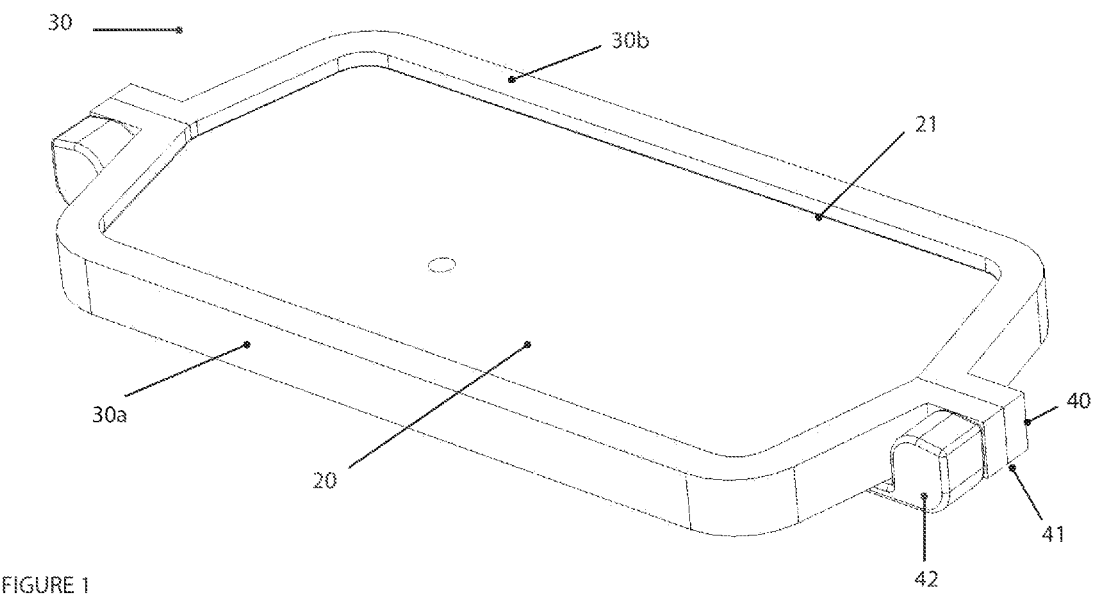
FIG. 1 shows: a perspective view of a plate and closure member when joined and locked in position.

FIG. 1 illustrates a waterproof closure system which is generally shown as 1 where there is a plate 20 and a closure member 30 formed of two parts 30a and 30b which form a border around the plate when locked in position around the periphery 21 of the plate. The closure member has an extension 40 on each end of the closure member and when the parts of the closure member are brought together they are separated by a split 41 between a pair of extensions. As shown the extensions 40 form support for a male part 42 and female part 44 (not shown) of the male and female closing mechanisms that draw the sections together and lock them in position around the plate 20. The water proof closure member typically is made from a plastic material and in particular a mouldable plastic material.

Figure 2:
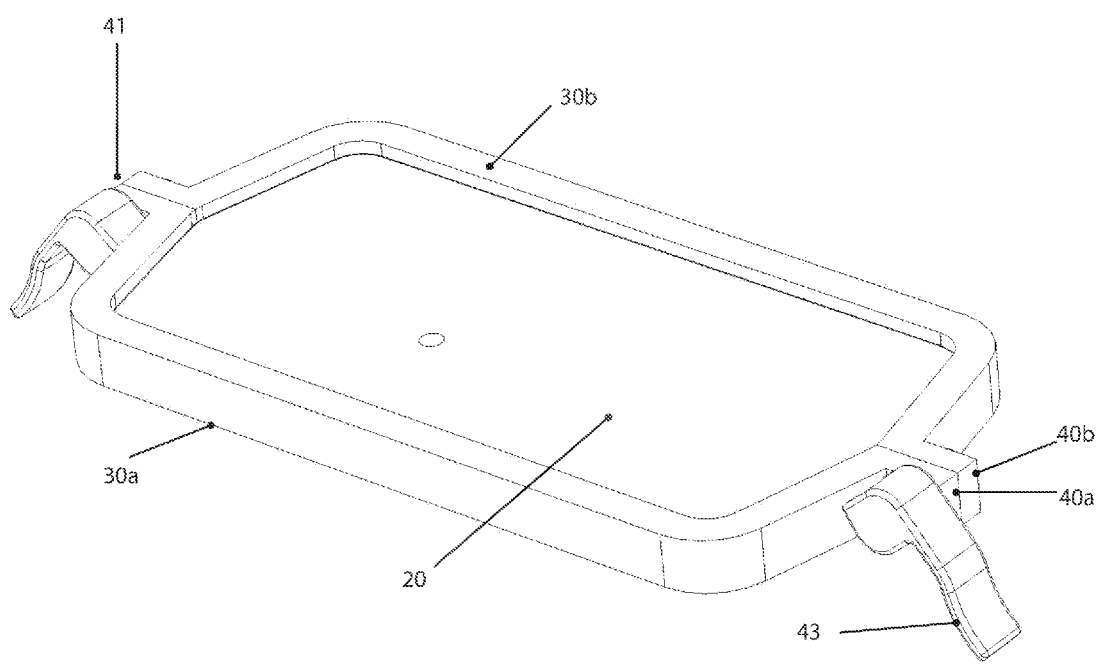
FIG. 2 shows: a perspective view of plate and closure member according to FIG. 1 with a lever being moved to an open position.

When the closure member is locked around the plate the male and female parts close the spilt 41 tightly by drawing extensions 40a and 40b together. However when lever 43 that forms part of the male part 42 is rotated away from the underside of plate 20 this allows the male and female parts to move away from one another thereby loosening the closure member from around the periphery of the plate as shown in FIG. 2.

Figure 3:
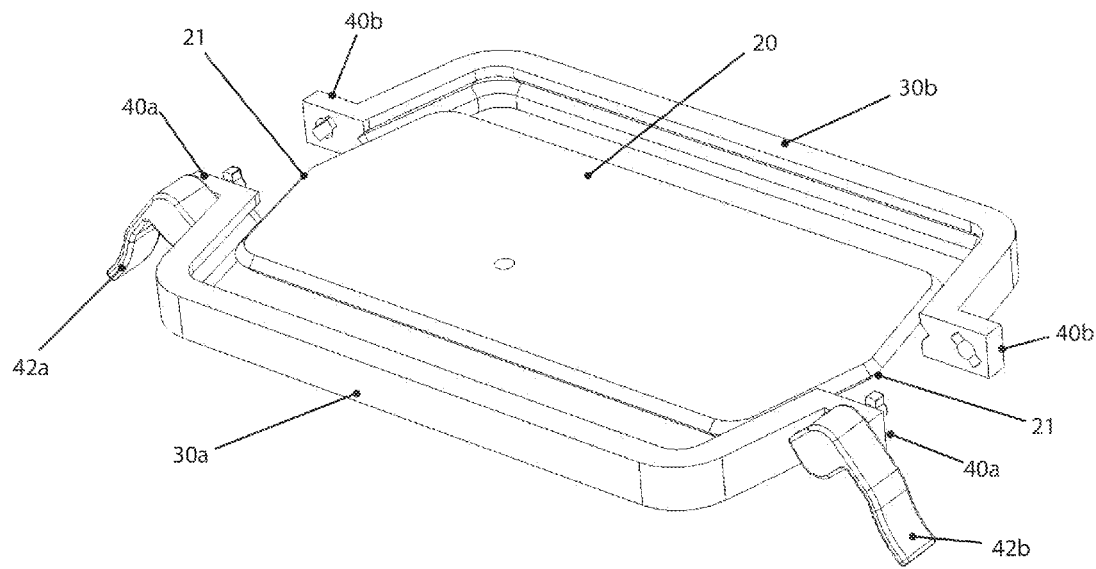
FIG. 3 shows: a perspective view of plate and closure member of FIG. 1 when separated from one another.

The two parts of the closure member can be separated from one another as shown in FIG. 3. The plate 20 is shown as being of a generally rectangular shape with two longer sides and two shorter sides where the shorter sides rather than being parallel to one another are each in the form of an apex 21a projecting away from the centre of the plate. The corners of the plate and the apex are bevelled as are the corners of the closure member so that there are no sharp angles that could damage a bag that is being sealed by the water proof closure system.

Figure 4:
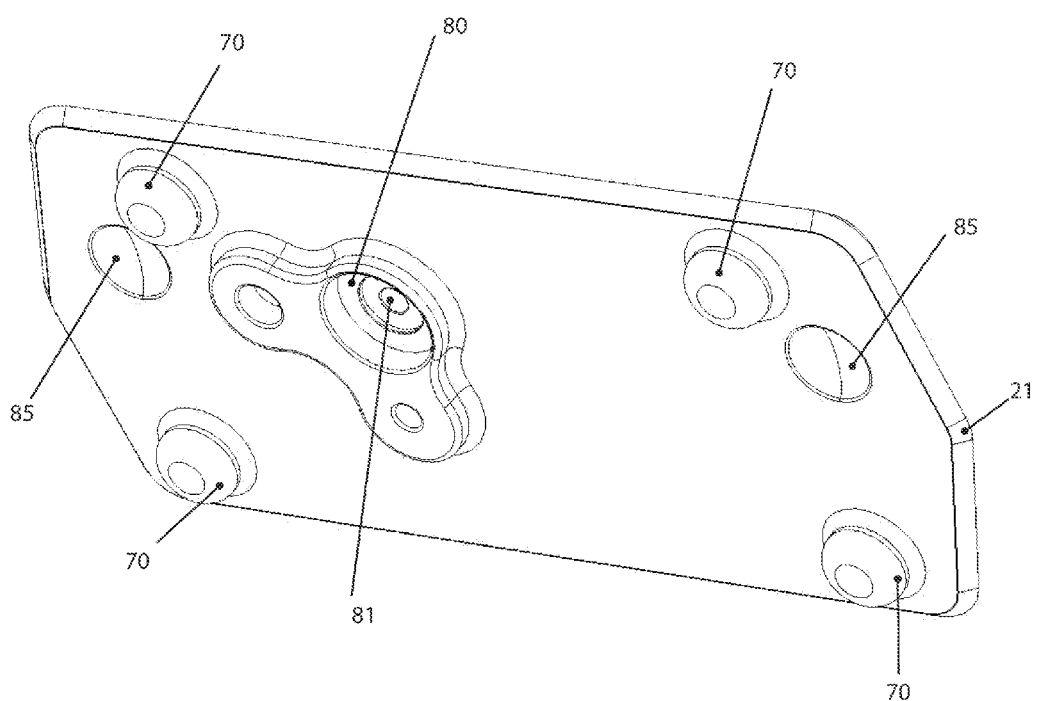
FIG. 4 shows: the underside of a plate and closure member of FIG. 3.

FIG. 4 shows the back of the plate which can be fitted to the object that is to be placed in a bag that the water proof closure system is used with. The plate 20 has feet 70 which as shown are raised areas towards the corners of the plate. Also there is a recessed area 80 which is positioned towards one corner of the plate. The recess has an aperture 81 which can receive a fixing e.g. a screw so the plate can be fixed to an object such as a camera. In this case the fixing point is positioned so that it will attach to most, if not all SLR cameras because there is an international standard for the position of fixing points on cameras so they can be affixed to a tripod. The positioning of the fixing point on the plate 20 takes advantage of this fact so that the plate 20 can be fixed to all SLR cameras. By having the plate fixed to the camera, and also by having feet on the plate, the camera may be placed on a surface using the plate. Placing the plate on a surface so that the camera is supported so that the lens itself does not rest on the surface reduces the risk of damage to the camera lens. Also there are recesses 85 at either end of the back of the plate 20 towards the apex area. The recesses are to receive the ends of respective levers when folded back into the locked position and as the ends of the levers are in these recesses it make it more difficult for the levels to be inadvertently lifted so that the seal around the plate is broken so allowing fluid into a bag that the water closure system is being used to seal. The female element 44 can be seen in situ.

Figure 5:
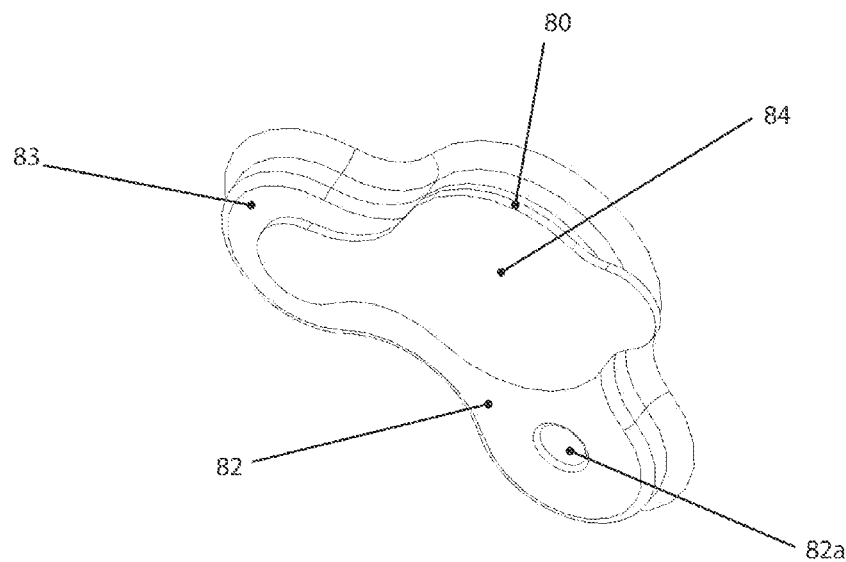
FIG. 5 shows: a close up view of a cover over a fixing point for attaching the plate to a surface.

The recess has two lobes 82 and 83, each with its own aperture (82a shown) which are shown in more detail in FIG. 5. One of the apertures is larger than the other to distinguish the two. One of the apertures (the larger) is to hold a sealing point of a bung 84 that is placed over the fixing that attaches the plate to the camera. The bung is an additional element to make sure that there is no possibility of ingress of water into the camera to which the plate is secured. The other aperture, which is smaller, is to enable the camera to be fixed to a tripod.

Figure 6:
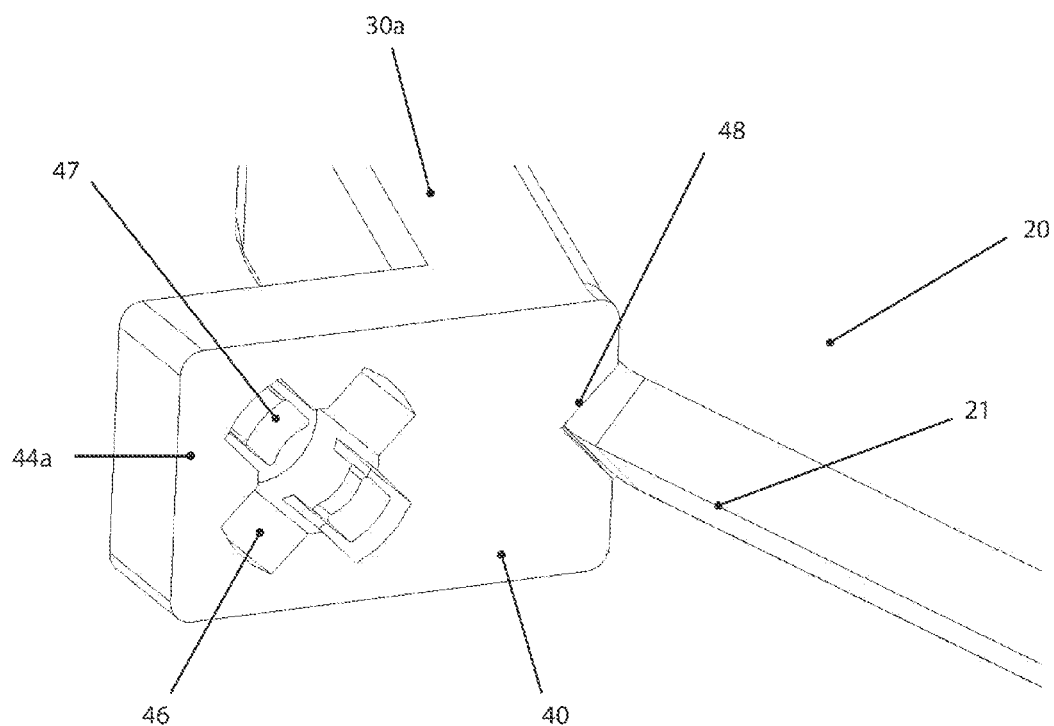
FIG. 6 shows: a close up view of a groove in the closure member.

FIG. 6 shows the sealing face 44a of extension 40 which forms the female part 30b of the closure member prior to the male part 42 being fitted. A substantially cross shaped aperture 46 is formed in the extension 40. Two attachment lugs 47 form part of the extension 40 in opposite arms of the cross shaped aperture 46. The male part 42 (not shown) includes a lever 43 from which extends a T-shaped bar, as can be seen in FIG. 3. The T-shaped bar substantially matches the shape of two opposite arms of the cross-shaped aperture 46 in the extension 40. During initial assembly of the closure system, the T-shaped bar of the male part 42 is inserted through the cross-shaped aperture 46. The attachment lugs are biased against the shaft of the bar and operate to retain the male part 42 in place by means of one or more detents formed on the bar against which the lugs engage. The length of the shaft of the male part is such that when the male part is fully inserted the T-shaped bar passes completely through the cross-shaped aperture 46 such that the lever and T-shaped bar can be freely rotated. An end of each extension 40 also includes a V-shaped cut out 48. The V-shaped cut out is off centres to the end of each extension so that parts 30a and 30b can only be orientated in one way relative to one another which avoids the risk of the parts being misaligned so that they will not fit accurately around the periphery of the plate 20.

Figure 7:
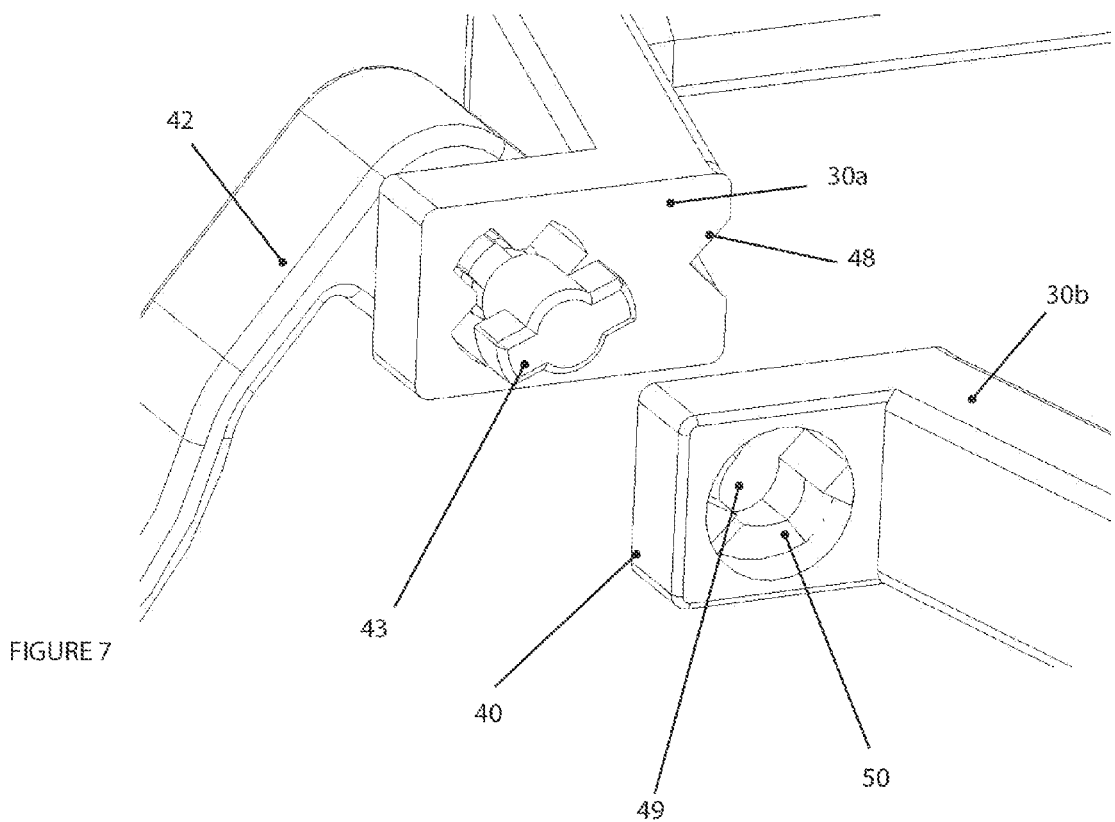
FIG. 7 shows: a close up view of the can/ramp arrangement used to clamp the plate and closure member together.

FIG. 7 illustrates the extension 40 of the second part 30b when viewed from the side opposite to the sealing face, i.e. the 'outside' when assembled. The extension 40 also has an aperture 49 extending through it, the aperture being substantially the same shape as the T-shaped bar of the male part 42 and being located in a corresponding position to the cross-shaped aperture 46 of the opposing extension of the first part 30a. The aperture 49 also includes a pair of recessed cam surfaces 50 that each defines a curved path forming a quarter circle that is centred about the centre of the aperture 49.

In operation, to secure the two parts 30a and 30b about the edge of the plate 20, the two parts are put in place around the edge of the plate 20. This results in it being possible to align the T-shaped bar of each male part 42, by rotating the corresponding lever 43 such that the respective bars can be inserted through the corresponding aperture 49 in the second part 30b. Subsequent rotation of the lever 43 causes rotation of the T-shaped bar and causes the T-shaped bar to engage with the recessed cam surfaces 50 formed within the apertures 49. As the T-shaped bar traverses across the cam surfaces, the two parts 30a and 30b are drawn tightly together, thus improving the seal formed between the two parts and the plate 20.

Figure 8:
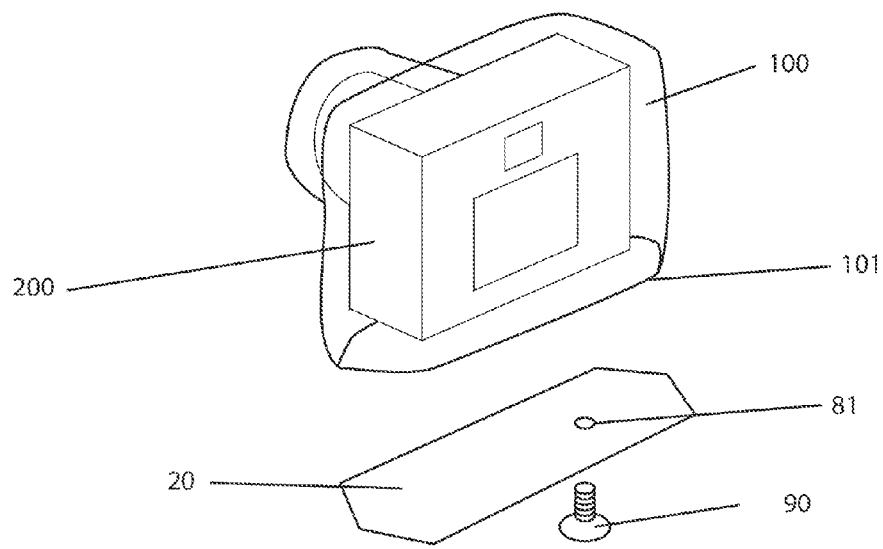
FIG. 8 shows; use of the plate and closure member for enclosing a camera within a bag held in position using the plate and closure elements of the previous figures.

FIG. 8 schematically illustrates the closure system in use with a camera 200. A clear flexible enclosure 100 houses the camera 200. The enclosure may be shaped to substantially conform to the shape of the camera or may be a simple bag like shape. Preferably the bag is formed from a flexible material such as a thermoplastic polyurethane (TPU) because such plastics are easily formable, they are temperature resistant so that can be used in hot or cold conditions, they are resistant to water/chemicals which means that the bag will not degrade easily and also there is a slight elasticity to such plastics which allows the bag to compress within the water proof closure system because in effect the bag becomes its own o ring type seal. Examples of thermoplastic films are TPU—Thermoplastic Polyurethane, PVC—polyvinyl chloride and EVA—ethyl vinyl acetate.

The enclosure has an opening to allow the camera to be inserted into the enclosure. The opening has recess 101 formed around the inner periphery of the opening which conforms substantially to the shape of the plate 20. The plate 20, as previously discussed includes a hole 81 through which camera mounting screw 90 may pass, the screw being arranged to screw into a tripod mount located on the base of the camera and thus secure the camera to the plate 20. In use, the recess 101 of the enclosure 100 is fastened about the periphery of the plate 20 and first and second parts 30a and 30b (not shown) subsequently placed about the periphery of the plate and enclosure and fastened together, thus forming a liquid tight seal about the periphery of the plate. The enclosure is preferably formed from a material sufficiently flexible for the camera controls to be operated from outside the enclosure, thus allowing the camera to be used when submerged in a liquid, such as during swimming.

The system of the invention is particularly good at sealing objects within an bag because it involved not only a closure in one plane i.e. the male and female closure but also there is closure in a second plane by the action of the lever which tightens the closure member around periphery of the bag. Also by having integral parts that are not separate from the closure member there is no risk of losing fixings and also the arrangement is easy to use.

It should be noted that the above mentioned embodiments illustrate rather than limit the invention and that alteration or modifications are possible without departing from the scope of the invention as described and claimed. It is also to be noted that the invention covers not only individual embodiments but also combinations of any of the embodiments described.

The invention claimed is:

1. A waterproof closure system provided by a plate having a periphery and at least one closure member which can be fitted around the periphery of the plate such that when the plate and closure member are joined the closure member forms a border around the periphery of the plate, the closure member having at least two elements separated by a split in the closure member, with there being locking member that can secure said two elements together so closing the split and securing the closure member around the periphery of the plate thereby locking a mouth of a bag around the plate if placed between the plate and closure.

2. A waterproof closure system according to claim 1 wherein a male part is provided on a first element on one side of said split and a female part provided on a second element on the other side of said split and engagement of the male and female part draws the two elements together thereby closing the split.

3. A waterproof closure according to claim 2, wherein the male part is a screw and the female apart is an aperture for receiving the screw.

4. A waterproof closure system according to claim 2, wherein the male part is formed of a shaft having a first end with a profile that fits a keyhole in the female part, and a second end of the male part remote from the first end having a lever substantially at right angles to the shaft such that when the male and female parts are joined the lever can be turned to lock the male and female parts together.

5. A waterproof closure system according to claim 1, wherein the plate is formed of a rectangle having an apex at either end.

6. A waterproof closure system according to claim 1, wherein the closure member is formed of two elements that are releasably securable together to form a border around the periphery of the plate.

7. A waterproof closure system according to claim 4, wherein the female member is formed as an aperture having a first face with at least one cut out which receives a matching profile from the male part, said aperture having a second face having a cut away and cam surface that allows the profile of the male part to turn when in the female part on actuation of the lever.

8. A waterproof closure system according to claim 1, wherein each element making up a closure member is formed of a linear section each end of which has a leg extending obliquely therefrom with an extension projecting outwardly from the respective leg.

9. A waterproof closure system according to claim 8, wherein one element making up the closure member has male parts at either end while the second element has female parts at either end.

10. A waterproof closure system according to claim 9, wherein each element has an inner face which when attached to the plate comes into contact with the periphery of the plate, said inner face having a groove running along said inner surface.

11. A waterproof closure system according to claim 10, wherein the groove is offset to the centre of the inner face.

12. A waterproof closure system according to claim 1, wherein the plate has fixing means so that the plate may be attached to an object that is to be inserted in the bag.

13. A waterproof closure system according to claim 12, wherein the plate has a fixing position to allow the plate to be secured to an SLR camera.

14. A waterproof closure system according to claim 1, wherein the plate has feet on its underside.

15. A waterproof closure system according to claim 1 in combination with a bag.

16. A waterproof closure system according to claim 15, wherein the closure member is formed of two parts that are hinged together.

17. A waterproof closure system according to claim 16, wherein a portion of the mouth of the bag is fixed to the plate along a portion of the periphery of the plate and one part of the closure member is positioned over this part of the plate and another portion of the bag is not attached to the plate so that an item can be inserted in the bag, following which the other part of the closure member that is hinged to the first can be brought into contact with the periphery of the plate to lock the bag against the plate.

18. A waterproof closure system according to claim 15 wherein the bag is formed of a thermoplastic film and in particular polyurethane, polyvinyl chloride (PVC), ethylene vinyl acetate (EVA).

19. A waterproof closure system according to claim 15, wherein the mouth of the bag has ridge extending around the mouth of the bag which can seat within a groove on an inner face of the closure member.

20. A method of sealing a bag around an electronic device comprising attaching a plate having a periphery to said electronic device, positioning a mouth of a bag over the electronic device and around the periphery of the plate, positioning a closure member around the plate so the closure member forms a border around the periphery of the plate, inserting a first end of a male part provided on the closure member on a first side of a split in a female part provided on a second side of said split, and activating a lever on a second end of the male remote from the first end to turn so locking the male and female parts together to secure the closure member around the periphery of the plate so locking the mouth of the bag around the plate to enclose and seal the electronic the object in the bag which is sealed by the waterproof closure system.

21. A waterproof closure system according to claim 5, wherein the female member is formed as an aperture having a first face with at least one cut out which receives a matching profile from the male part, said aperture having a second face having a cut away and cam surface that allows the profile of the male part to turn when in the female part on actuation of the lever.

22. A waterproof closure system according to claim 5, wherein the female member is formed as an aperture having a first face with at least one cut out which receives a matching profile from the male part, said aperture having a second face having a cut away and cam surface that allows the profile of the male part to turn when in the female part on actuation of the lever.

23. A waterproof closure system according to claim 16 wherein the bag is formed of a thermoplastic film and in particular polyurethane, polyvinyl chloride (PVC), ethylene vinyl acetate (EVA).

24. A waterproof closure system according to claim 17 wherein the bag is formed of a thermoplastic film and in particular polyurethane, polyvinyl chloride (PVC), ethylene vinyl acetate (EVA).

25. A waterproof closure system according to claim 16, wherein the mouth of the bag has ridge extending around the mouth of the bag which can seat within a groove on an inner face of the closure member.

26. A waterproof closure system according to claim 17, wherein the mouth of the bag has ridge extending around the mouth of the bag which can seat within a groove on an inner face of the closure member.

27. A waterproof closure system according to claim 18, wherein the mouth of the bag has ridge extending around the mouth of the bag which can seat within a groove on an inner face of the closure member.

\* \* \* \* \*